Sept. 8, 1970 V. BUSH 3,527,049
COMPOUND STIRLING CYCLE ENGINES
Filed Nov. 3, 1967 2 Sheets-Sheet 1

INVENTOR
VANNEVAR BUSH

ATTORNEY

INVENTOR
VANNEVAR BUSH

United States Patent Office 3,527,049
Patented Sept. 8, 1970

3,527,049
COMPOUND STIRLING CYCLE ENGINES
Vannevar Bush, 304 Marsh St., Belmont, Mass. 02178
Filed Nov. 3, 1967, Ser. No. 680,491
Int. Cl. F03g 7/06; F25b 9/00
U.S. Cl. 60—24                                    3 Claims

ABSTRACT OF THE DISCLOSURE

Methods and apparatus for compounding Stirling cycle engines and control methods and apparatus are described herein.

HISTORY

Stirling cycle hot gas or hot air engines are very old. They gave promise of good efficiency when Stirling, in 1825, introduced the regenerator, but low output per pound or output per cubic foot caused the engines to be superseded by internal combustion engines.

Internal combustion engines have several disadvantages. One significant cause of air pollution is the widespread use of Otto cycle internal combustion engines. Intermittent and rapid combustions produce noise and vibrations in internal combustion engines. Since those engines operate best with a deficiency of air, unburned hydrocarbons, which are damaging air pollutants, are present in the exhaust. Otto cycle engines require volatile fuels, and vapors of those fuels escape from fuel tanks and carburetors and additionally pollute the atmosphere.

Hot gas engines have several advantages. Uniform fuel burning in external combustion engines provides quiet and relatively vibration free operation. Stirling cycle engines produce few pollutants. Combustion occurs in a furnace and is best accomplished with an excess of air, which ensures complete oxidation of all hydrocarbons. Less volatile fuels may be used for external combustion; fuel storage and carburetion are not sources of pollution.

Because external combustion engines have inherent advantages including quiet operation and the ability to operate on many fuels, and because fuels are completely oxidized for economical and pollution-free operation, much research and development has been carried on by large corporations to provide external combustion engines that would be competitive with internal combustion engines. In recent years intensified air pollution problems and increased government pollution controls have influenced increased research in the field. Notwithstanding the inherent advantages of Stirling cycle engines, their disuse continues. In spite of the expenditure of much time, effort and money, the search continues; no competitive Stirling cycle external combustion engine has been developed.

Many attempts have been made to overcome output-to-weight ratio disadvantages of Stirling cycle engines by employing inert gas at relatively high pressure instead of air as a working gas and by using metals capable of operating at high temperatures. Those improvements have been only partially successful.

Increasing operating temperatures has increased engine efficiency, which is calculated from ranges of temperatures in regenerators. However, overall efficiency (output compared to input) has been low because much of the furnace heat is wasted. The lowest temperature at which heat may be extracted from the furnace gas by the working gas is determined by the lowest temperature in the hot cylinder. Some of the heat remaining in the furnace gas after heating the operating gas may be used to preheat incoming furnace air, but that makes the furnace burn hotter, and an upper limit furnace operation is reached before all of the excess heat may be used. Consequently, a great amount of heat is wasted.

In a copending application Ser. No. 540,306, filed Apr. 5, 1966, it has been shown how the Stirling cycle engine output may be increased radically by bypassing working gas through exterior heaters and coolers during relatively idle portions of the cycles. When that is done, it still is apparent that full advantage is not taken of high temperatures which are allowable due to the use of modern alloys.

SUMMARY OF THE INVENTION

Stirling cycle engines compounding

The invention described herein discloses the compounding of Stirling engines to gain maximum use of available heat.

As an example of compound operation, in a first stage of a Stirling cycle compound engine, gas flows from a heater to a regenerator at 1800° F., a high temperature in the regenerator is maintained at 1580° F. After expanding in the hot cylinder, gas returns to a heater at about 1200° F. Furnace gas encounters a second heater at about 1250° F. Gas from the second heater enters the second stage regenerator at 1100° F. The top second stage regenerator temperature is 800° F. Gas enters the heater from the second stage hot cylinder at approximately 500° F. Furnace gases leaving the second heater are about 550° F. A 300 degree drop is used in an air preheater, so that stack temperature is about 250° F.

The efficiency of the second stage engine is not as good as the efficiency of the first stage, for the second stage operates over a lesser range of temperatures. The second stage efficiency is fairly good, however, and usable work is extracted from what otherwise would be stack losses. Moreover the use of a second stage makes it possible to economically use high furnace temperatures in the first stage, thereby making it possible to operate the first stage at a very high efficiency without wasting heat.

The two stages may be independent, each with its own working gas, heater and cooler, but there is advantage in interconnecting them. The gas leaving the hot cylinder of the first stage is at an excellent temperature for input to the regenerator of the second stage. The gas leaving the hot cylinder of the second stage can then enter the low temperature end of a long single heater, there to be gradually brought up during its passage to the high temperature to enter the regenerator of the first stage. This avoids the presence of a gap in temperature which would otherwise occur if two separate heaters were used.

Bypassing gas from a hot cylinder to a heater before the gas enters a regenerator and compounding of heaters and cylinders are mutually dependent for the highest possible efficiency in engine operation. If bypassing is not used, that is, if heat is added to the gas directly through the cylinder walls, compounding may not be highly effective. One set of cylinders may be heated very hot, and another set may be heated less hot. The advantages of taking gas from a cylinder where it has been cooled, gradually raising its temperature as it flows, and then delivering it to a regenerator at maximum temperatures cannot be obtained by simply differentially heating sets of cylinders. Restoring heat gradually, which is the essence of good thermodynamics may be accomplished only with bypassing. Using all of the heat practically available may be accomplished only by compounding. Consequently, both compounding and bypassing must be used to achieve the highest possible economy in engine operation.

Engine output control

For practical use of any engine, some method of controlling power output must be provided. In internal combustion engines, fuel control is satisfactory. In Stirling cycle engines, response to changes in fuel feed may be too slow. Patent application 540,306 describes a phase shifting method of power control; other output controls are described herein.

It is desirable for most purposes to hold temperatures constant. At the hot end of the furnace temperature is held constant by a thermocouple, a relay and valves in fuel and air supplies. A thermocouple at the hot end of a regenerator signals a relay to open a heater bypass valve when the regenerator is heated beyond a maximum temperature. It is usually necessary to bypass the heater only for one or two cycles to reduce the regenerator temperature below its allowed maximum.

Since engine output is directly related to average gas pressure in the system, output control may be effected by changing system pressure. Pressure in the cooler varies above and below average system pressure during each cycle. Two lines having check valves pointing in opposite directions are connected between a cooler and a relatively large reservoir containing gas at average system pressure. Opening a solenoid valve in a line having a check valve which allows gas to flow out of the system and into the reservoir at high pressure intervals of the cycle reduces system pressure and engine power. When a solenoid valve is opened in the other line a check valve permits flow from the reservoir into the system at intervals when cooler pressure is below reservoir pressure. Adding gas to the system increases system pressure and engine output.

For vehicle use it is highly desirable to control engine power with a foot pedal. To operate the solenoid valves in the reservoir-cooler lines, a foot pedal is connected to a solenoid-controlling switch. In order that the solenoid valves may be closed after the engine has adequately responded to an ordered change in power, the pedal and switch are additionally connected to an engine pressure sensing device, which acts in opposition to pedal depression.

The pressure sensing device may be a chamber communicating with a cooler through a tube having a restriction. The restriction allows the chamber to accumulate average pressure within the cooler, without subjecting the chamber to cyclic pressure variations. A diaphragm or piston moves in response to pressure changes in the chamber, and the foot pedal, diaphragm and switch are connected by appropriate linkage and springs. When a foot pedal is depressed to order more power, the switch moves to energize a solenoid valve which admits gas to the system. As system pressure increases, the diaphragm moves and returns the switch to its central, disengaged position. Releasing a pedal closes another set of contacts to reduce system pressure until the diaphragm responds to open the contacts.

In another system of output control a camshaft may carry master rotary valves to actuate a pneumatic valving system which control gas flow to the cylinders, regenerators, heaters and coolers. Rotating cylindrical valves which are driven by the camshaft at engine speed selectively apply and exhaust pressure to and from poppet valves which control engine operating gas flow. Pressure may be supplied to the valve system by a small tube with a check valve leading from the cold cylinder to a chamber which contains helium at nearly maximum pressure.

Poppet valves may have close fitting pistons and springs to insure rapid closing. Since they operate at 1,000 p.s.i. at ⅛ inch diameter is sufficient for the pistons. Tubes to the poppet valves may have internal diameters of approximately 1/32″. Opening or closing of the poppet valves occupies two milliseconds or 20° of arc. Poppet valves are open for about 90° of a revolution. A starting valve supplies pressure to all of the poppet valve cylinders to hold all of the valves open and to relieve pressure in the system when starting the engine.

Preferably, two cylindrical rotary valves are mounted on the camshaft for use during running of the engine; the first supplies pressure to the poppet valves, and the other exhausts the poppet valves. Rotors of the cylindrical valves are mounted directly on the camshaft, which turns at engine speed. In a reversible engine, stators are restrained between two stops and are held against one stop during normal forward operation of the engine and are dragged to the other stop when the engine is reversed, so that the timing of valve openings is appropriate for reverse operation.

Engine construction

Heat transfer between cylinder walls and working gas and cumbersome weights of heat transfer apparatus have continued to be vexing problems in the development of efficient Stirling engines. Historically, cylinder walls of Stirling engines have been heated; inherent losses from the heat jackets and difficulties in introducing heat to operating gas through the cylinder walls have caused problems. The present invention eliminates heat jackets from hot cylinder walls. Very little heat is radiated to cylinder walls from the helium; consequently, little heat is lost to the atmosphere from lagged or unjacketed walls.

To avoid heat conduction losses between hot cylinders and the crankbase, the cylinders are mounted on thin tubes which extend upward from the crankbases. Cross heat guides may be mounted internally in the crankbase. Seals made from solid lubricants described herein are mounted within the tubes for lubricating and sealing the piston rods. Helium leaking past the piston rods and seals is trapped within the gas tight crankbase, which is formed with a ribbed aluminum construction.

To facilitate heat transfer and to reduce overall weight, heater tubes are made of composite construction. The inside tubes which meet only helium are built of a high strength alloy, and it neither oxidizes nor corrodes. The outside tube is thin and has little structural strength, but is highly resistant to chemical attack from the corrosive furnace gases.

An engine requires as auxiliaries, a battery, a charging generator, and a starting motor; the generator might be used in place of the latter. A reversing gear may be provided for small engines; in larger engines the starting motor and valves may be reversible.

OBJECTIVES OF THE INVENTION

This invention has among its objective the provision of compound Stirling cycle engines.

The provision of Stirling cycle engine operating gas control systems is another objective of this invention.

Another objective of this invention is the provision of system pressure controls for regulating engine output.

Further objectives of this invention will be apparent from the specification and drawings.

DETAILED DESCRIPTION OF DRAWINGS

Figure 1:
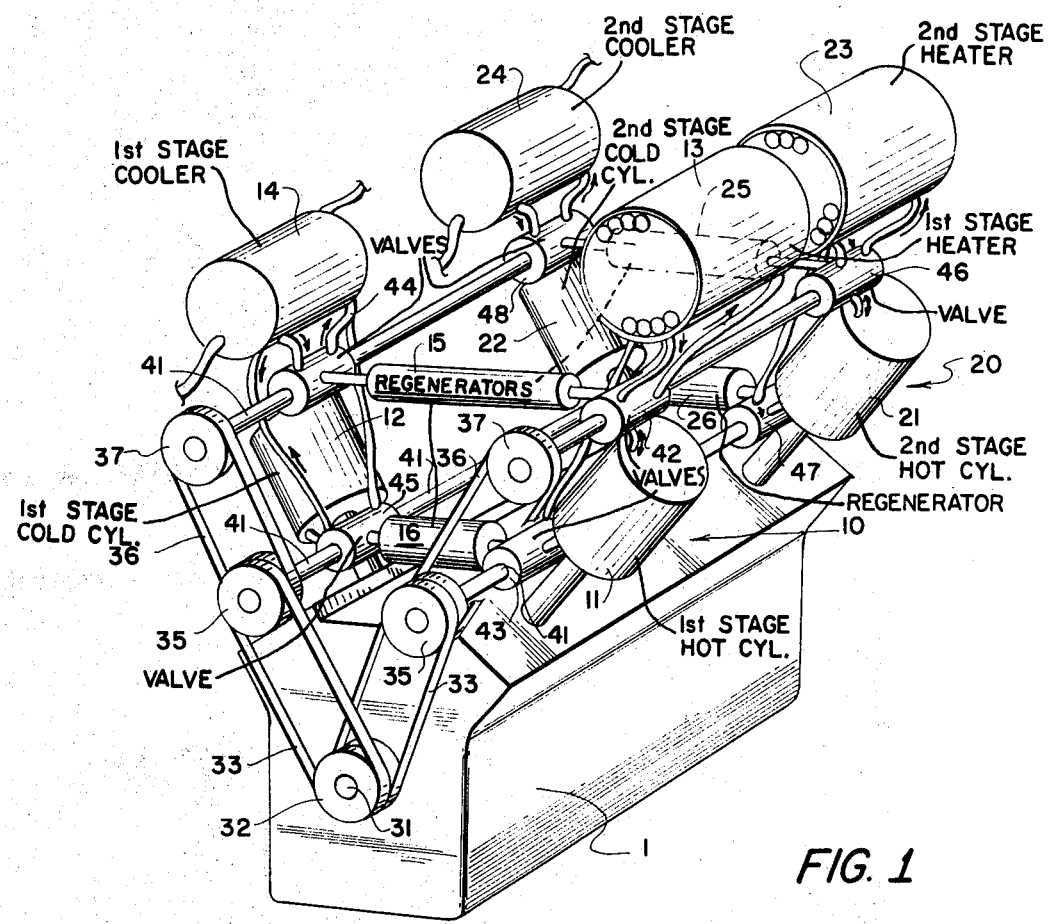
FIG. 1 is a schematic illustration of a Stirling cycle engine proposed herein.

Referring to the drawings, a preferred embodiment of a hot gas engine as shown in FIG. 1 has a crankcase 1 which supports cylinders, regenerators, valve shafts and valves. First and second stages are generally represented by the numerals 10 and 20. First stage 10 of the engine has a double-acting hot cylinder 11 and a double-acting cold cylinder 12. Opposite ends of cylinder 11 are connected to heater 13. Cooler 14 is connected to opposite ends of cold cylinder 12. Upper ends of cylinders 11 and 12 are interconnected through regenerator 15; lower ends of the first stage cylinders are interconnected through valves through regenerator 16, which is volumetrically equal to the upper regenerator 15.

Upper and lower ends of second stage hot cylinder 21 are connected through valves to heater 23. Upper and lower ends of double acting cold cylinder 22 are connected in a similar manner to cooler 24. Respective ends of the cylinders are connected through regenerators 25 and 26.

Crankshaft 31 is keyed to grooved pulley 32 which moves notched belts 33 to rotate double pulleys 35, belts 36 and pulleys 37. Pulleys 35 and 37 are notched and are of a size equal to pulleys 32 so that all of the valve shafts 41 rotate at engine speed.

First stage rotary valves 42, 43, 44 and 45 have rotors and stators which are cooperatively grooved to connect the associated heaters and regenerators during appropriate 90° intervals. For the remaining 270° intervals, the valves directly interconnect the respective cylinder ends and regenerators. Second stage rotary valves 46, 47, 48 and 49 are structurally and functionally similar to valves in the first stage.

As described in the identified copending application, passing gas into and out of the heater or cooler may occur when volume of the hot cylinder is decreasing, when pressure in the system is low, and when little work is being performed by the operating gas.

Opposite hot and cold cylinders preferably are mounted slightly out of line. Since the cylinders are mounted in a 90° "V" and operate 90° out of phase, pitmans from opposite cylinders may be connected to a single crank on the crankshaft. Each phase gives four power pulses. Connecting the second stage 45° out of phase with the first stage produces eight power pulses per revolution.

As described in the co-pending application a single regenerator may be used to connect all four cylinder ends in a single stage, since opposite ends of the cylinders are exactly 180° out of phase. In such a form, two valve shafts may replace the four valve shafts shown in FIG. 1, and four valves may be appropriately internally configured to supplant the operation of the eight valves shown in the drawings. However, it is desirable to keep the length of connections between cylinders and regenerators as small as possible to keep dead space in the system at a minimum.

Working gas passing into first heater 13 from first stage hot cylinder 11 enters at the low temperature end of heater 13 and moves in counter flow relationship with respect to the furnace gas. The temperature of the working gas is gradually raised, which is essential to good thermodynamics. The temperature of furnace gases leaving heater 13 can be no lower than the temperature of working gas entering the heater. Since gas enters the heater from the hot cylinder, its temperature is high, and much heat would be wasted in the furnace gas if the engine had a single stage. In the present case, the somewhat cooled gases leaving heater 13 enter second heater 23 where they heat working gas slowly passing through the heater after it has been expanded in the hot cylinder and before it is returned to the system for heating the regenerator.

Since the volume of the heaters is great compared with the volume of the cylinders and regenerators, working gas flows slowly through the heaters, providing a gradual increase in temperature of the gas.

The coolers are also of relatively large volume compared to the remainder of the system, but they may be smaller than the heaters. It is desirable to circulate coolant at temperatures as low as available in both coolers. Consequently, compounding is not significant on the cold side.

Figure 2:
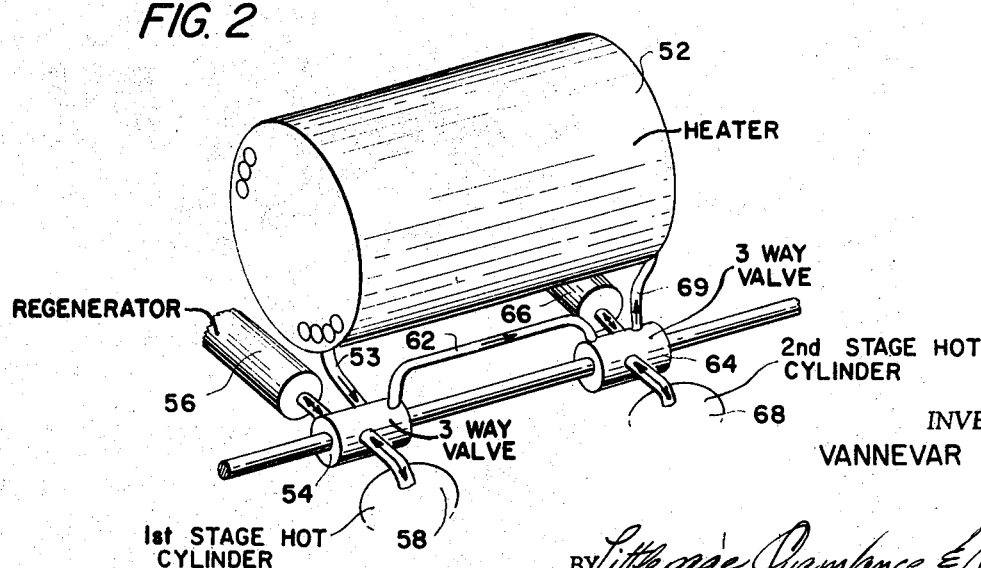
FIG. 2 is a schematic representation of a modified embodiment of a gas flow cycle for a Stirling cycle engine in a partial illustration.

An alternate gas flow system in which the first and second stages are interconnected in the hot side of the stages is shown in FIG. 2. At an appropriate time, heated operating gas passes from the hot end of heater 52 through line 53 and valve 54 into first stage regenerator 56. Then the gas passes from regenerator 56 into first stage hot cylinder 58. Gas is exhausted from cylinder 58 through valve 54, line 62 and valve 64 into second stage regenerator 66. Gas passes from regenerator 66 into hot cylinder 68. Exhausted gas passes from second stage hot cylinder 68 through valve 64 and line 69 into the cool end of heater 52 where the temperature of the flowing gas is uniformly raised by counter-flowing furnace gases.

Figure 3:
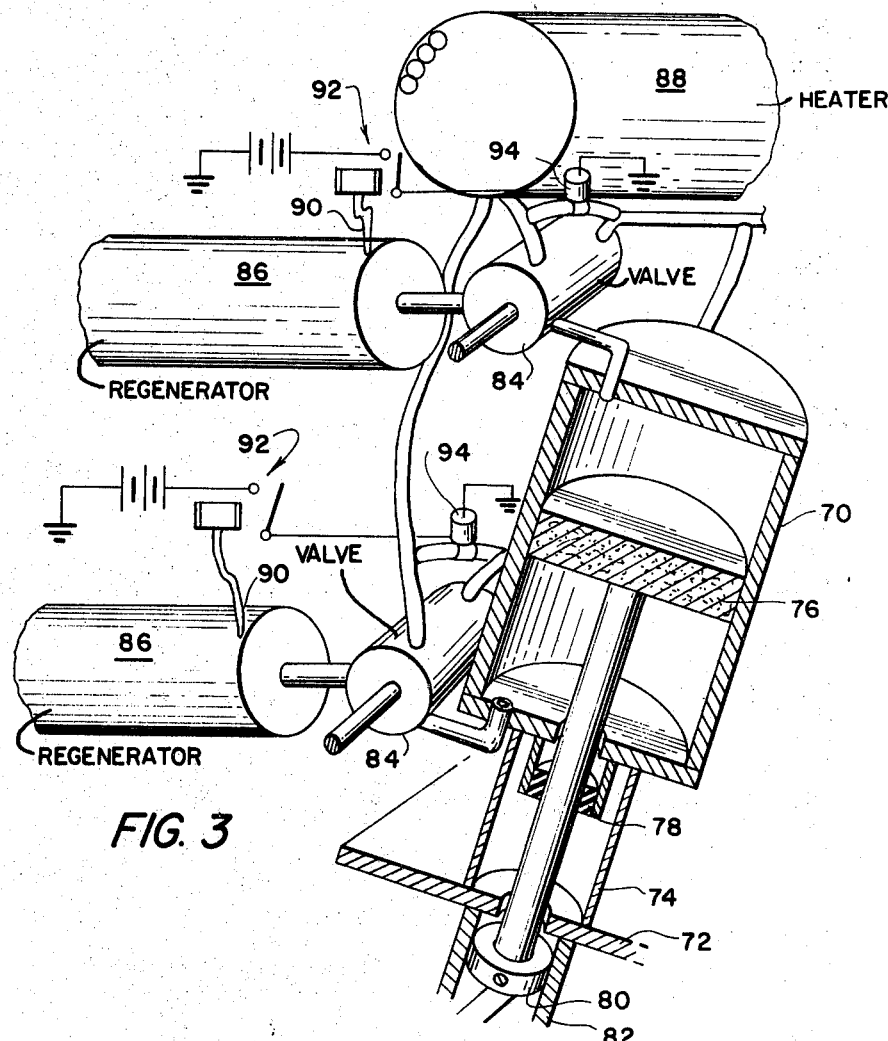
FIG. 3 is a schematic representation of hot cylinder apparatus and of a regenerator temperature-responsive control for bypassing a heater.

In FIG. 3 a double acting hot cylinder 70 is mounted on crankbase head 72 with a thin walled tube 74 to reduce heat conduction. A solid lubricant may be used for piston 76 and piston rod seal 78. Crosshead 80 moves within crosshead guides 82 mounted internally on head 72. Continuously rotating valves 84 selectively connect cylinder 70 and regenerators 86, and, at appropriate times, cylinder 70, heater 88, and regenerators 86 in bypass arrangement.

Thermocouples 90 energize relays 92, which in turn close circuits to energize solenoid valves 94 when temperature in the regenerators exceeds an allowable maximum. The regenerators are rapidly cooled when the heater is bypassed; consequently, it is necessary to hold valves 94 open for only one or two cycles. Similar thermocouples in the hot end of furnace 88 energize relays to vary fuel and air settings to maintain hot end furnace temperature constant.

Engine output may be controlled by varying system pressures. Since pressures are relatively uniform throughout the system and vary in a ratio of approximately 1 to 10 during each cycle, it is convenient to add or remove gas to or from the cooler through parallel lines having check valves pointing in opposite directions. The lines pass through controlled valves to a large reservoir holding gas at average system pressure. The crankbase is a convenient reservoir when solid lubricants are used throughout the system so that there is no possibility of contaminating the gas by liquid lubricants. Some form of servo system, either hydraulic, pneumatic or electrical, is useful so that valves in the parallel lines may be controlled by a substantially conventional accelerator.

Figure 4:
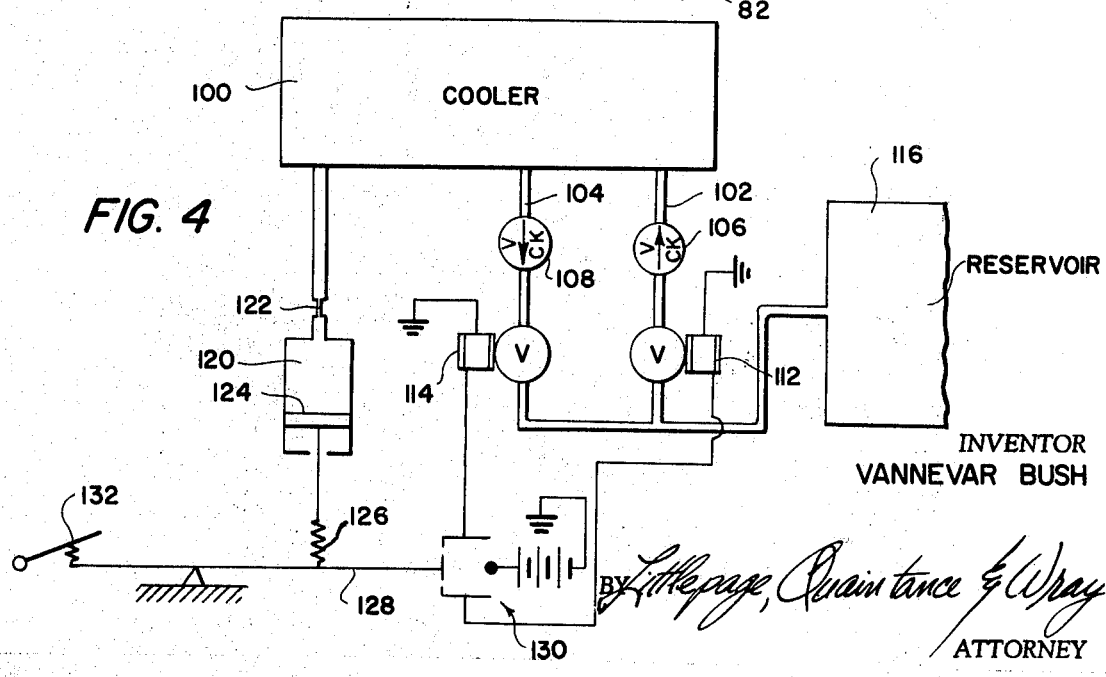
FIG. 4 is a schematic diagram of a servo mechanism for controlling engine power output.

As shown in FIG. 4, two parallel tubes 102 and 104 have check valves 106 and 108 pointing toward and away from operating gas cooler 100. Solenoid valve 112 controls line 102; solenoid valve 114 controls line 104. Gas is stored in reservoir 116 at a pressure between maximum and minimum system pressure, preferably at the average system pressure.

Average system pressure is collected in chamber 120. Since pressure in the system fluctuates greatly during each cycle, a restriction 122 is employed so pressure fluctuations during each cycle will have little effect upon chamber 120. The size of restriction 122 is such that chamber 120 will approximate average system pressure within a few cycles of the engine. Piston or diaphragm 124 moves in chamber 120 against the force of spring 126. The remote end of spring 126 is connected by linkage 128 to switch 130 which controls solenoid valves 112 and 114. As pressure in the system and in chamber 120 is decreased, piston 124 and spring 126 pull switch into position to energize the solenoid valve opening line 102 and allowing pressure to flow from reservoir 116 into cooler 100 during portions of the cycle when reservoir pressure is greater than system pressure. Energization of solenoid 112 continues until pressure in chamber 120 has built up sufficiently to return switch 130 to its central position. Foot pedal or accelerator 132 is connected to linkage 128 to add to the effect of chamber 120 in controlling switch 130.

A single servo system is suitable for controlling power output of most compound hot gas engines and especially of an engine such as shown in FIG. 2, in which both stages are interconnected.

Although this invention has been described in part by specific details of one or more preferred embodiments, it will be obvious to those skilled in the art that several adaptations and modifications may be made without departing from this invention. The scope of the invention is defined only in the appended claims.

I claim:

1. A hot gas engine comprising a first stage having first hot and cold expansible chambers and a first regenerator connected therebetween, and a second stage having second hot and cold expansible chambers and a second regenerator connected therebetween, means connected to the chambers for cyclically varying volume thereof, working gas disposed in the chambers and regenerators for movement back and forth between the hot and cold chambers through the regenerators as chambers volumetrically vary in Stirling cycle relationship, coolers connected to the cold chambers for cooling the working gas, and first and second heat exchangers respectively connected to the first and second hot chambers for heating working gas, and furnace means for generating heat and transferring heat to the heat exchangers, the furnace means having flow directing means for directing furnace heat to the first heat exchanger then to the second heat exchanger, whereby the first stage receives furnace heat at one temperature and the second stage receives furnace heat at a lesser temperature.

2. A hot gas engine comprising a first stage having first hot and cold expansible chambers and a first regenerator connected therebetween, and a second stage having second hot and cold expansible chambers and a second regenerator connected therebetween, means connected to the chambers for cyclically varying volume thereof, working gas disposed in the cylinders and regenerators for movement back and forth between the hot and cold chambers through the regenerators as the chambers volumetrically vary in Stirling cycle relationship, coolers connected to the cold chambers for cooling the working gas therein, a heat exchanger connected between the first and second hot chambers, and valve means for directing working gas from the first hot chamber in the first stage to the second hot chamber in the second stage and from the second stage through the heat exchanger to the first stage.

3. Apparatus for controlling output of a hot gas engine by increasing or decreasing an amount of working gas in a hot gas engine comprising: a gas reservoir, an outward flow permitting valve means connected between the engine and the reservoir for permitting gas flow from the engine to the reservoir upon opening of the valve means, an inward flow permitting valve means connected between the engine and the reservoir for providing gas flow to the engine upon opening, an expansible chamber, a gas flow rate limiting restriction connected between the chamber and the engine for allowing gas to slowly pass between the chamber and the engine for isolating the chamber from cyclic gas pressure variations in the engine, a pressure responsive means to the chamber for reciprocal movement with respect thereto upon varying of pressure within the chamber, resilient means connected to the pressure responsive means for urging the pressure responsive means inward in the chamber, and manual control means connected to the resilient means for increasing or decreasing force applied to the pressure responsive means by the resilient means, and servomechanism means connected between the pressure responsive means and the valve means for opening the outward valve means upon outward movement of the pressure responsive means with respect to the chamber, and for opening the inward valve means upon inward movement of the pressure responsive means.

References Cited

UNITED STATES PATENTS

| | | | |
|---|---|---|---|
| 2,480,525 | 8/1949 | Van Weenen | 60—24 |
| 2,616,245 | 11/1952 | Van Weenen | 60—24 |
| 2,643,507 | 6/1953 | Dros | 60—24 |
| 2,664,699 | 1/1954 | Köhler | 60—24 |
| 2,794,315 | 6/1957 | Meijer | 60—24 |
| 3,312,072 | 4/1967 | Gifford | 62—6 |
| 3,372,539 | 3/1968 | Reinhoudt | 60—24 |
| 3,379,026 | 4/1968 | Cowans | 62—6 |
| 3,397,533 | 8/1968 | Steiner et al. | 60—24 |

FOREIGN PATENTS 63,822    7/1949    Netherlands.

MARTIN P. SCHWADRON, Primary Examiner

R. BUNEVICH, Assistant Examiner

U.S. Cl. X.R.

62—6

UNITED STATES PATENT OFFICE
CERTIFICATE OF CORRECTION

Patent No. 3,527,049          Dated September 8, 1970

Inventor(s) Vannevar Bush

It is certified that error appears in the above-identified patent and that said Letters Patent are hereby corrected as shown below:

Claim 3 at column 8, line 13, before "to", insert

--connected--.

SIGNED AND SEALED
NOV 17 1970

(SEAL)
Attest:

Edward M. Fletcher, Jr.

Attesting Officer

WILLIAM E. SCHUYLER, JR.
Commissioner of Patents